United States Patent Office 3,275,623
Patented Sept. 27, 1966

3,275,623
3,17-DISUBSTITUTED-1,3,5(10)-ESTRATRIENE DERIVATIVES
Lawrence H. Knox, Mexico City, Mexico, assignor to Syntex Corporation, Panama, Panama, a corporation of Panama
No Drawing. Filed May 1, 1964, Ser. No. 364,292
Claims priority, application Mexico, July 27, 1962, 68,398
20 Claims. (Cl. 260—239.55)

This is a continuation-in-part of copending application Serial No. 221,424, filed September 5, 1962, now abandoned.

The present invention relates to certain novel cyclopentanophenanthrene derivatives and to a method for making the same.

More particularly, it relates to certain novel 17α-fluoro, 17β-chlorofluoroacetoxy, and 17β-methyl derivatives of ring A aromatic steroids, represented by the following formulas:

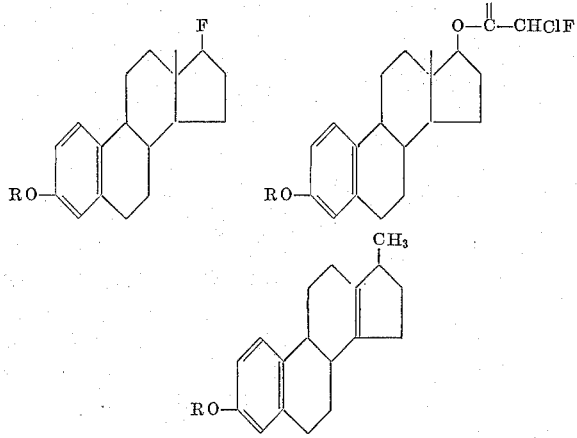

wherein R represents lower alkyl, lower aryl, lower aralkyl, tetrahydropyranyl or an acyl group of less than 12 carbon atoms, which may be saturated or unsaturated, of straight, branched, cyclic or mixed cyclic-aliphatic chain, substituted or not with other functional groups such as hydroxyl, alkoxy, amino, halogen or other groups.

Typical such esters are the acetate, propionate, valerate, enanthate, undecenoate, benzoate, trimethylacetate, terbutylacetate, phenoxyacetate, cyclopentylpropionate, aminoacetate and β-chloropropionate.

These compounds are powerful progestational agents with low estrogenic activity, useful in menstrual disorders and in fertility control.

The substitution of primary and secondary hydroxyl groups by a fluorine atom has been described in the literature, for example by N. N. Yarovenko et al. in the Journal of General Chemistry of the USSR, vol. 29, 2159 (1959).

In my copending patent application Serial No. 353,263, filed March 19, 1964, there has been described the transformation of testosterone, $\Delta^1$-testosterone and substituted derivatives thereof into a mixture of 17α-fluoro, 17β-chlorofluoroacetoxy and 17β-methyl compounds.

In accordance with the present invention, it has been found that the treatment of the 3-ethers or 3-esters of estradiol with 2-chloro-1,1,2-trifluorotriethylamine in a suitable organic solvent produces also three compounds: the 17α-fluoro-steroid resulting from the replacement of the hydroxy group by fluorine, with simultaneous inversion of configuration, the 17β-chlorofluoroacetoxy compound and the dehydration product with migration of the 13β-methyl group, as illustrated by the scheme shown at bottom of column.

In the formulas below R has the same meaning as heretofore indicated.

In practicing the process outlined above, the starting materials, i.e., the 3-alkoxy and 3-acyloxy-17β-hydroxy-$\Delta^{1,3,5(10)}$-estratrienes (I) are treated with 1 to 1.5 molar equivalents of 2-chloro-1,1,2-trifluorotriethylamine in an inert organic solvent, at a temperature comprised between room temperature and the steam bath, for a period of time of between 5 minutes to 3 hours. The solvent is then evaporated to dryness under vacuum, and the residue chromatographed on Florisil or neutral alumina, to produce the 17β-methyl-$\Delta^{13}$-(II), 17α-fluoro-(III) and 17β-chlorofluoroacetoxy-(IV) ring A aromatic compounds.

Adequate solvents for this reaction are: acetonitrile, ethers such as diethylether, isopropyl ether, dioxane, tetrahydrofuran, Dowanol, and the like, aromatic hydrocarbons such as benzene, toluene, xylene, etc.; in general, the reaction can be carried out in any organic solvent without acidic hydrogen.

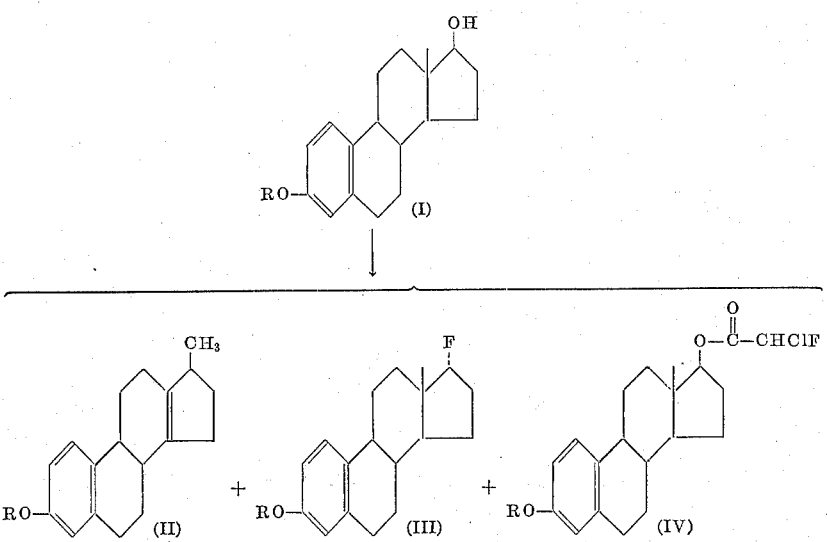

Examples of suitable starting materials are: estradiol 3-methyl ether, estradiol 3-ethyl ether, estradiol 3-carboxymethylether, estradiol 3-benzyl ether, estradiol 3-tetrahydropyranylether, estradiol 3-acetate, estradiol 3-propionate, estradiol 3-valerate, estradiol 3-trimethylacetate, estradiol 3-t-butylacetate, estradiol 3-caproate, estradiol 3-valerate, estradiol 3-octanoate, estradiol 3-decanoate and estradiol 3-benzoate.

In addition to the aforementioned starting materials, there can be used the 3 ethers or esters of estradiol further substituted, for example by methyl groups at C-1, 2, 4, 6, 7, 16, etc.

The following examples serve to illustrate but are not intended to restrict the scope of the invention:

PREPARATION I

From a solution of 5 g. of estradiol in 100 cc. of benzene there were distilled 5 cc. of solvent to remove moisture; similarly 10 mg. of p-toluenesulfonic acid was dissolved in 50 cc. of benzene and 5 cc. of solvent were distilled. The two solutions were combined, 1 molar equivalent of dihydropyran was added and the reaction mixture refluxed for 16 hours. It was then cooled, decanted from starting material and evaporated to dryness. The residue was chromatographed on neutral alumina. The crystalline fractions eluted with benzene gave the pure 3-tetrahydropyranyl ether of estradiol.

This compound may also be obtained by conventional treatment of estrone with dihydropyran, followed by reduction of the tetrahydropyranylether of estrone with sodium borohydride.

Example I

A mixture of 8.5 g. of estradiol-3-methyl ether, 100 cc. of anhydrous tetrahydrofuran and 8.5 g. of 2-chloro-1,1,2-trifluorotriethylamine was kept at room temperature for 30 minutes. The solvent was then removed by evaporation in vacuo at room temperature and the residue was chromatographed on 300 g. of Florisil.

The first fractions eluted with hexane gave 3.7 g. of 3-methoxy - $17\beta$ - methyl - $\Delta^{1,3,5(10),13}$-18-nor estratetraene, M.P. 107–108° C., $[\alpha]_D$ +42° (CHCl$_3$), $\lambda$ max. 280, 287 m$\mu$, log $\epsilon$ 3.30, 3.20, which was purified by crystallization from methanol.

The later crystalline fractions eluted with the same solvent gave 2.35 g. of 3-methoxy-17$\alpha$-fluoro-$\Delta^{1,3,5(10)}$-estratriene, M.P. 96–98° C.; $[\alpha]_D$ +62° (CHCl$_3$); $\lambda$ max. 278–280, 287 m$\mu$, log $\epsilon$ 3.31, 3.27.

Further elution of the column with hexane-ether 9:1 gave 1 g. of the 17$\beta$-chlorofluoroacetate of 3-methoxy-estradiol, M.P. 145–147° C.; $[\alpha]_D$ +41° (CHCl$_3$); $\lambda$ max. 278, 287 m$\mu$, log $\epsilon$ 3.35, 3.29.

Example II

To a solution of 2 g. of estradiol-3-methyl ether in 25 cc. of methylene chloride, there was added 1.1 molar equivalents of 2-chloro-1,1,2-trifluorotriethylamine and the reaction mixture was refluxed for 10 minutes under anhydrous conditions, evaporated to dryness at room temperature under reduced pressure, and the residue chromatographed on 100 g. of neutral alumina, to produce 3-methoxy - 17$\beta$ - methyl-$\Delta^{1,3,5(10),13}$-18-nor-estratetraene, 3-methoxy-17$\alpha$-fluoro-$\Delta^{1,3,5(10)}$-estratriene and 3-methoxy-17$\beta$-chlorofluoroacetoxy-$\Delta^{1,3,5(10)}$-estratriene, identical to the products obtained in the preceding example.

Example III

A solution of 1 g. of the 3-tetrahydropyranylether of estradiol in 15 cc. of acetonitrile was treated with 1.5 molar equivalents of 2-chloro-1,1,2-trifluorotrimethylamine, and the reaction mixture was kept at room temperature for 1 hour. Upon evaporation of the solvent and chromatography of the residue on Florisil there were produced 3-tetrahydropyranyloxy - 17$\beta$ - methyl - $\Delta^{1,3,5(10),13}$-18-nor-estratetraene, 3-tetrahydropyranyloxy-17$\alpha$-fluoro-$\Delta^{1,3,5(10)}$-estratriene and 3-tetrahydropyranyloxy-17$\beta$-chlorofluoroacetoxy-$\Delta^{1,3,5(10)}$-estratriene.

Example IV

In accordance with the method described in Example I, the compounds mentioned below under I were converted into the produces set forth under II, which was separated by chromatography.

| I | II |
|---|---|
| Estradiol-3-ethyl-ether | 3-ethoxy-17$\beta$-methyl-$\Delta^{1,3,5(10),13}$-18-nor-estratetraene. 3-ethoxy-17$\alpha$-fluoro-$\Delta^{1,3,5(10)}$-estratriene and 3-ethoxy-17$\beta$-chlorofluoroacetoxy-$\Delta^{1,3,5(10)}$-estratriene. |
| Estradiol-3-benzyl-ether | 3-benzyloxy-17$\beta$-methyl-$\Delta^{1,3,5(10),13}$-18-nor-estratetraene. 3-benzyloxy-17$\alpha$-fluoro-$\Delta^{1,3,5(10)}$-estratriene and 3-benzyloxy-17$\beta$-chlorofluoroacetyoxy-$\Delta^{1,3,5(10)}$-estratriene. |
| Estradiol-3-carboxymethylether | 3-carboxymethoxy-17$\beta$-methyl-$\Delta^{1,3,5(10),13}$-18-nor-estratetraene. 3-carboxymethoxy-17$\alpha$-fluoro-$\Delta^{1,3,5(10)}$-estratriene and 3-carboxymethoxy-17$\beta$-chlorofluoroacetoxy-$\Delta^{1,3,5(10)}$-estratriene. |
| Estradiol-3-acetate | 3-acetoxy-17$\beta$-methyl-$\Delta^{1,3,5(10),13}$-18-nor-estratetraene. 3-acetoxy-17$\alpha$-fluoro-$\Delta^{1,3,5(10)}$-estratriene and 3-acetoxy-17$\beta$-chlorofluoro-acetoxy-$\Delta^{1,3,5(10)}$-estratriene. |
| Estradiol-3-valerate | 3-valeroxy-17$\beta$-methyl-$\Delta^{1,3,5(10),13}$-18-nor-estratetraene. 3-valeroxy-17$\alpha$-fluoro-$\Delta^{1,3,5(10)}$-estratriene and 3-valeroxy-17$\beta$-chlorofluoro-acetoxy-$\Delta^{1,3,5(10)}$-estratriene. |
| Estradiol-3-trimethylacetate | 3-trimethylacetoxy-17$\beta$-methyl-$\Delta^{1,3,5(10),13}$-18-nor-estratetraene. 3-trimethylacetoxy-17$\alpha$-fluoro-$\Delta^{1,3,5(10)}$-estratriene and 3-trimethylacetoxy-17$\beta$-chlorofluoroacetoxy-$\Delta^{1,3,5(10)}$-estratriene. |
| Estradiol-3-caproate | 3-caproxy-17$\beta$-methyl-$\Delta^{1,3,5(10),13}$-18-nor-estratetraene. 3-caproxy-17$\alpha$-fluoro-$\Delta^{1,3,5(10)}$-estratriene and 3-caproxy-17$\beta$-chlorofluoroacetoxy-$\Delta^{1,3,5(10)}$-estratriene. |
| Estradiol-3-t-butylacetate | 3-t-butylacetoxy-17$\beta$-methyl-$\Delta^{1,3,5(10),13}$-18-nor-estratetraene. 3-t-butylacetoxy-17$\alpha$-fluoro-$\Delta^{1,3,5(10)}$-estratriene and 3-t-butylacetoxy-17$\beta$-chlorofluoroacetoxy-$\Delta^{1,3,5(10)}$-estratriene. |
| Estradiol-3-benzoate | 3-benzoxy-17$\beta$-methyl-$\Delta^{1,3,5(10),13}$-18-nor-estratetraene. 3-benzoxy-17$\alpha$-fluoro-$\Delta^{1,3,5(10)}$-estratriene and 3-benzoxy-17$\beta$-chlorofluoroacetoxy-$\Delta^{1,3,5(10)}$-estratriene. |

I claim:
1. A compound of the following formula:

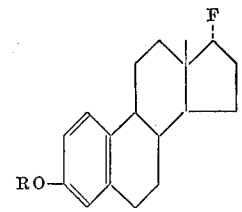

wherein R is selected from the group consisting of lower alkyl, lower aryl, lower aralkyl, tetrahydropyranyl and lower acyl of less than 12 carbon atoms.
2. 3-methoxy-17$\alpha$-fluoro-$\Delta^{1,3,5(10)}$-estratriene.
3. 3-ethoxy-17$\alpha$-fluoro-$\Delta^{1,3,5(10)}$-estratriene.
4. 3-benzyloxy-17$\alpha$-fluoro-$\Delta^{1,3,5(10)}$-estratriene.
5. 3-acetoxy-17$\alpha$-fluoro-$\Delta^{1,3,5(10)}$-estratriene.
6. 3-benzoxy-17$\alpha$-fluoro-$\Delta^{1,3,5(10)}$-estratriene.
7. 3-caproxy-17$\alpha$-fluoro-$\Delta^{1,3,5(10)}$-estratriene.
8. 3 - tetrahydropyranyloxy - 17$\alpha$-fluoro-$\Delta^{1,3,5(10)}$-estratriene.

9. A compound of the following formula:

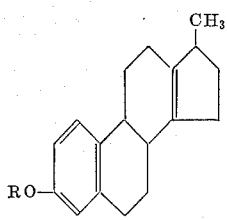

wherein R is selected from the group consisting of lower alkyl, lower aryl, lower aralkyl, tetrahydropyranyl and lower acyl of less than 12 carbon atoms.

10. 3 - methoxy-17β-methyl-$\Delta^{1,3,5(10),13}$-18-nor-estratetraene.

11. 3 - ethoxy - 17β-methyl-$\Delta^{1,3,5(10),13}$-18-nor-estratetraene.

12. 3 - benzyloxy - 17β-methyl-$\Delta^{1,3,5(10),13}$-18-nor-estratetraene.

13. 3 - acetoxy - 17β-methyl-$\Delta^{1,3,5(10),13}$-18-nor-estratetraene.

14. 3 - benzoxy - 17β-methyl-$\Delta^{1,3,5(10),13}$-18-nor-estratetraene.

15. 3 - caproxy - 17β-methyl-$\Delta^{1,3,5(10),13}$-18-nor-estratetraene.

16. 3 - tetrahydropyranyloxy - 17β-methyl-$\Delta^{1,3,5(10),13}$-18-nor-estratetraene.

17. A compound of the following formula:

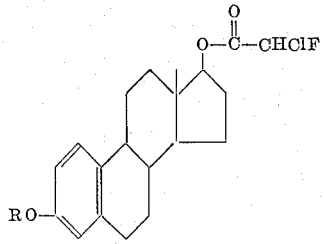

wherein R is selected from the group consisting of lower alkyl, lower aryl, lower aralkyl, tetrahydropyranyl and lower acyl of less than 12 carbon atoms.

18. 3 - methoxy-17β-chlorofluoroacetoxy-$\Delta^{1,3,5(10)}$-estratriene.

19. 3 - ethoxy-17β-chlorofluoroacetoxy-$\Delta^{1,3,5(10)}$-estratriene.

20. 3 - acetoxy-17β-chlorofluoroacetoxy-$\Delta^{1,3,5(10)}$-estratriene.

References Cited by the Examiner
UNITED STATES PATENTS

| | | | |
|---|---|---|---|
| 2,906,758 | 9/1959 | Kincl et al. | 260—397.5 |
| 3,117,142 | 1/1964 | Snozzi et al. | 260—397.5 |
| 3,151,134 | 9/1964 | Denot et al. | 260—397.45 |

LEWIS GOTTS, *Primary Examiner.*

JOHNNIE R. BROWN, *Assistant Examiner.*